United States Patent
Pfaff et al.

[11] Patent Number: 6,044,827
[45] Date of Patent: Apr. 4, 2000

[54] EXHAUST GAS RECIRCULATION ARRANGEMENT

[75] Inventors: Rüdiger Pfaff, Stuttgart; Joachim Wiltschka, Fellbach; Franz Bender, Wendlingen, all of Germany

[73] Assignee: DaimlerChrysler AG, Stuttgart, Germany

[21] Appl. No.: 09/098,798

[22] Filed: Jun. 17, 1998

[30] Foreign Application Priority Data

Jun. 18, 1997 [DE] Germany .............................. 197 25 668

[51] Int. Cl.$^7$ .................................................. F02M 25/07
[52] U.S. Cl. ........................................................ 123/568.18
[58] Field of Search ........................... 123/568.18, 568.17

[56] References Cited

U.S. PATENT DOCUMENTS

| | | | |
|---|---|---|---|
| 3,733,827 | 5/1973 | Suzuki | 60/278 |
| 4,300,515 | 11/1981 | Straubel et al. | 123/568.18 |
| 5,163,295 | 11/1992 | Bradshaw | 123/568.18 |
| 5,609,143 | 3/1997 | Schellenberg et al. | 123/568.18 |
| 5,669,364 | 9/1997 | Everingham | 123/568.18 |
| 5,785,034 | 7/1998 | Moedinger et al. | 123/568.18 |

FOREIGN PATENT DOCUMENTS

| | | |
|---|---|---|
| 0 753 656 | 1/1997 | European Pat. Off. . |
| 14 76 052 | 8/1969 | Germany . |
| 30 01 413 | 8/1980 | Germany . |
| 29 25 495 | 1/1981 | Germany . |

Primary Examiner—Tony M. Argenbright
Assistant Examiner—Arnold Castro
Attorney, Agent, or Firm—Klaus J. Bach

[57] ABSTRACT

In an exhaust gas recirculation arrangement for an internal combustion engine with an air intake duct for supplying air to the engine, an exhaust gas recirculation pipe extending into the air intake duct for recirculation exhaust gas to the air intake duct and a disc valve arranged in the exhaust gas recirculation pipe for closing the exhaust gas recirculation pipe, the exhaust gas recirculation pipe has a pipe section which extends in the air intake duct in a downstream direction from the disc valve and has, at its downstream end, a nozzle-like discharge opening for discharging exhaust gas into the air intake duct.

16 Claims, 2 Drawing Sheets

EXHAUST GAS RECIRCULATION ARRANGEMENT

BACKGROUND OF THE INVENTION

The invention resides in an exhaust gas recirculation arrangement for an internal combustion engine with an air intake duct and an exhaust gas recirculation passage which extends into the air intake duct at a predetermined angle and which includes a passage section extending in the intake duct in the flow direction of the air in the intake duct.

In order to improve the combustion of internal combustion engines and to improve the exhaust gas quality, a part of the exhaust gases can be recirculated from the exhaust gas manifold to the air intake duct of the engine. It is important for an effective exhaust gas recirculation that the exhaust gas is uniformly mixed with the intake air and that the recirculated exhaust gas volume does not unintentionally change over the operating period or over the life of the engine, but that it is admixed to the intake air only dependent on the selected control parameters. Furthermore, the hot exhaust gases should not thermally overload the exhaust gas recirculation system.

EP 0 753 656 A1 discloses an exhaust gas recirculation arrangement including a pneumatic control device disposed on the air intake channel of an internal combustion engine and having a membrane with a rod, which extends through the air intake channel transversely to the flow direction through the channel and controls, by a valve member that is a valve disc connected to the membrane rod, the flow cross-section of the exhaust gas recirculation passage. The valve member which is highly heated by the exhaust gas and the membrane rod are cooled by the intake air flow. The impurities contained in the exhaust gas such as carbon and rust particles are said to be carried along by the exhaust gas flow without entering the space between the membrane rod guide structure and the membrane rod. In this way, locking of the valve is said to be prevented.

DE 30 01 413 C2 further discloses an exhaust gas recirculation arrangement including an exhaust gas recirculation pipe which is disposed between an exhaust gas pipe and an air intake passage. One end of the exhaust gas recirculation pipe which includes a receiver opening extends into the exhaust gas pipe and has a section which extends in the exhaust gas pipe coaxially therewith. The receiver opening extends in the exhaust gas pipe in the upstream direction, but is shielded regarding the exhaust gas flow by a pot-like cover.

The cover and a deflector for the exhaust gas to be recirculated keep small particles contained in the exhaust gas away from the exhaust gas recirculation structure. As a result, the amount of deposits in the gas passages of the exhaust gas recirculation system is reduced and the operability of the arrangement is improved. It is noted that solid particles in the recirculated exhaust gas increase the wear of the internal combustion engine, particularly of the pistons, the piston rings and the cylinders. In addition, they detrimentally affect the lubrication capabilities of the lubricating oil and consequently the bearings of the engine.

The circumferential wall of the cover may be so formed that, by a venturi effect, cross-section restriction or respectively, by a jet effect, small particles that may have entered are accelerated together with the gas flow but cannot follow a flow reversal of the exhaust gases by 180° into the receiver opening because of their inertia. In this way, even fewer particles enter the exhaust gas recirculation arrangement.

In addition to the exhaust gas recirculation pipe, often a vent line for the crankcase enters the intake air duct generally ahead of a compressor. The vent gases include oil vapors and cause together with the particles contained in the exhaust gas undesirable deposits in the exhaust gas recirculation arrangement, which deposits detrimentally affect the operation of the control devices and which, over time, restrict the flow cross-section of the exhaust gas recirculation system.

DE 14 76 052 C1 discloses a vent arrangement for the crankcase of an internal combustion engine, wherein the vent pipe is connected to the venturi pipe of a carburetor at the smallest flow cross-section thereof. In this way, the vacuum in the vent line increases with increasing engine load.

It is the object of the present invention to provide an exhaust gas recirculation arrangement, which is improved especially with regard to the influence of the crankcase venting system.

SUMMARY OF THE INVENTION

In an exhaust gas recirculation arrangement for an internal combustion engine with an air intake duct for supplying air to the engine, an exhaust gas recirculation pipe extending into the air intake duct for recirculating exhaust gas to the air intake duct and a disc valve arranged in the exhaust gas recirculation pipe for closing the exhaust gas recirculation pipe, the exhaust gas recirculation pipe has a pipe section which extends in the air intake duct in a downstream direction from the disc valve and has, at its downstream end, a nozzle-like discharge opening for discharging exhaust gas into the air intake duct.

In the exhaust gas recirculation system according to the invention the exhaust gas recirculation pipe projects into the air intake duct and supplies the exhaust gases downstream of a disc valve concentrically into the air intake duct in the flow direction of the intake air. Consequently, the intake air does not come into contact with the disc valve so that oil from the vent gases in the intake air and carbon cannot together be deposited on the valve guide or the valve seat of the disc valve. Such deposits could result in the disc valve to be locked or the flow cross-section in the area of the valve seat to be restricted over time. This is avoided with the arrangement according to the invention and at the same time, a uniform exhaust gas recirculation rate over the life of the engine is achieved.

A venturi type cross-section of the exhaust gas recirculation passage in the area where it joins the intake air flow may include a separate building component and have the form of a converging nozzle ejector, which accelerates the exhaust gas flow and, as a result, also accelerates the intake air and provides for uniform mixing of the exhaust gas with the intake air. The intake air also cools the parts of the exhaust gas recirculation structure, which are arranged in the intake air duct so that the disc valve and the control structure therefor are not thermally stressed.

The air intake duct is preferably narrowed in the area where the exhaust gas recirculation pipe joins the air intake duct. Since, with an acceleration of the flow, its pressure drops, the pressure difference between the exhaust gas recirculation pipe and the air intake duct increases and the exhaust gas recirculation rate is increased. With an increased exhaust gas recirculation flow rate, the intake air flow is correspondingly reduced and a throttle valve normally provided in the intake duct may be eliminated. Furthermore, the acceleration of the gas flow in the intake duct reduces the energy of the gas change and consequently, improves the efficiency of the internal combustion engine.

In a particular embodiment of the invention, an impingement shield is disposed downstream in front of the exhaust gas recirculation outlet, which promotes the mixture of exhaust gas and fresh intake air. With this arrangement, the nozzle-like restriction can be widened or not be provided.

The disc valve opens against the flow direction of the exhaust gases. As a result, it can be safely closed even if pressure pulses occur in the exhaust gas recirculation pipe.

In another embodiment of the invention, the exhaust gas recirculation pipe is widened just before the disc valve so as to form a double-cone shaped valve chamber. In this way, the exhaust gas flow is slowed down and then again accelerated whereby any particles can be deposited. In addition, the assembly of the disc valve is facilitated especially if the valve chamber is divided in the area of the largest diameter. Preferably, a part thereof which includes a connector nozzle has a flanged end by which it is mounted to the other part of the valve chamber which is connected to the air duct. At the same time, manufacturing of the air intake duct in the area of connection with the exhaust gas recirculation pipe is facilitated. In this area, the air intake duct forms a separate housing structure which includes a part of the valve chamber and a section of the exhaust gas recirculation passage and also a guide structure for the disc valve and which consists of a casting or die casting structure.

Further features and advantages of the invention will become apparent from the following description thereof on the basis of the accompanying drawings. The description and the drawings present various features in a particular combination. The features, however, should also be considered on their own merit and could be combined so as to form other reasonable arrangements.

DESCRIPTION OF A PREFERRED EMBODIMENT

Figure 1:
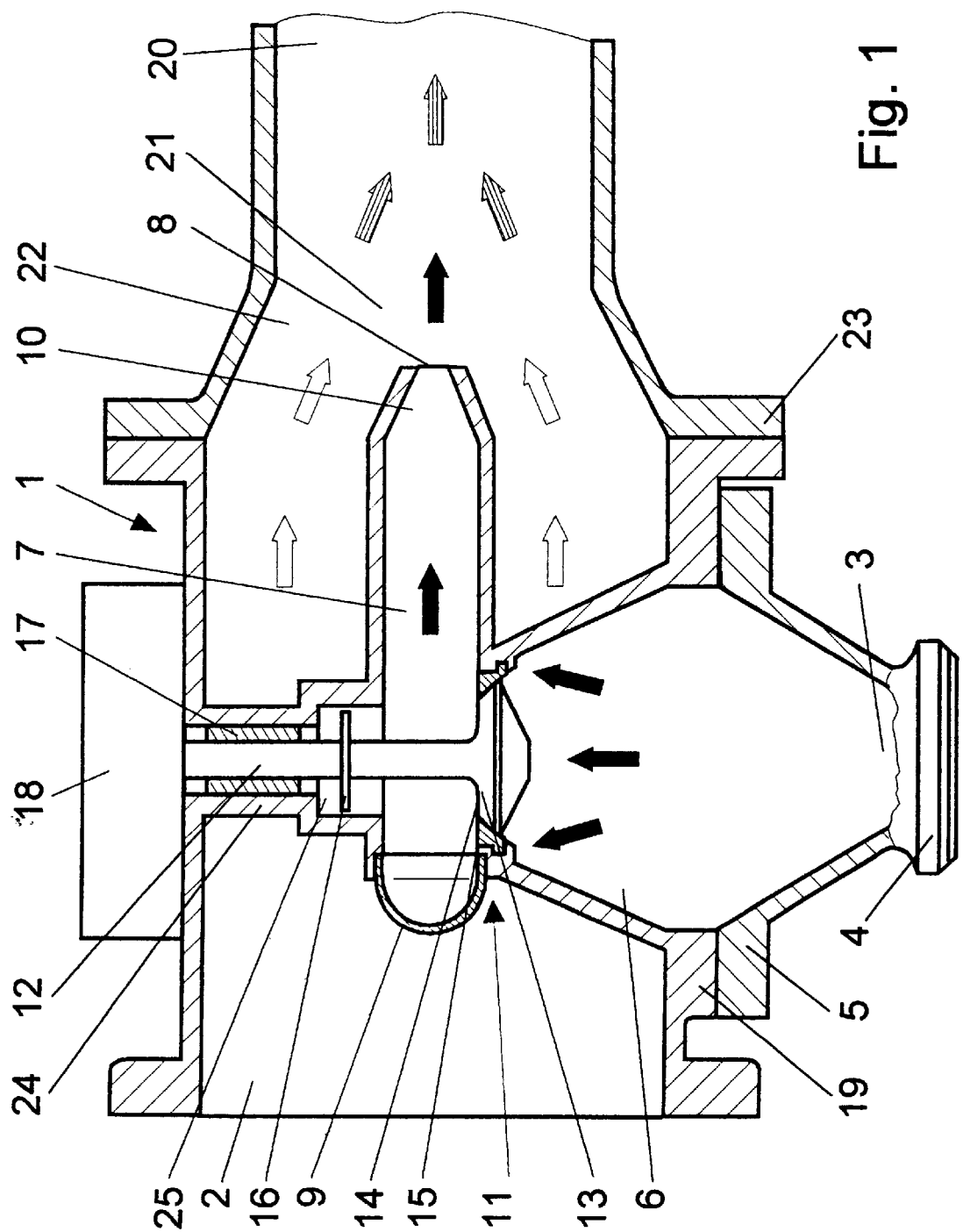
FIG. 1 is a partial cross-sectional view of the exhaust gas recirculation arrangement according to the invention.

An exhaust gas recirculation arrangement 1 of an internal combustion engine which is not shown, comprises an air intake duct 2 and an exhaust gas recirculation passage 3, which joins the air intake duct 2 at an angle of about 90°. Other angles may also be suitable.

The flow of the recirculated exhaust gases is shown by solid arrows, the flow of the intake air is shown by outlined arrows and the flow of the mixture is shown by hatched arrows. The exhaust gas recirculation passage 3 extends into the air intake duct 2 and includes a passage section 7, which extends essentially coaxially with the air intake duct 2 and which has a downstream discharge opening 8. In the area of the opening 8, the passage section 7 has a nozzle-like cross-section 10.

The air intake duct 2 of the exhaust gas recirculation arrangement 1 has throughout a uniform flow cross-section. In the area of the passage section 7, the diameter however is enlarged to accommodate the passage section 7 and valve installation. Downstream in the mixing area 21, where the exhaust gas from the passage section 7 is admixed to the air in the air intake duct 2, the diameter of the air intake duct is reduced providing a restricted flow area 22. Both measures promote singly and together good mixing of the exhaust gas with the intake air, so that all the cylinders of the internal combustion engine receive a uniform air/exhaust gas mixture. The flow cross-sections do not need to be circular, they may for example, be oval to facilitate the drainage of condensate to prevent its collection in the passage section 7 or the air intake duct 2.

Figure 2:
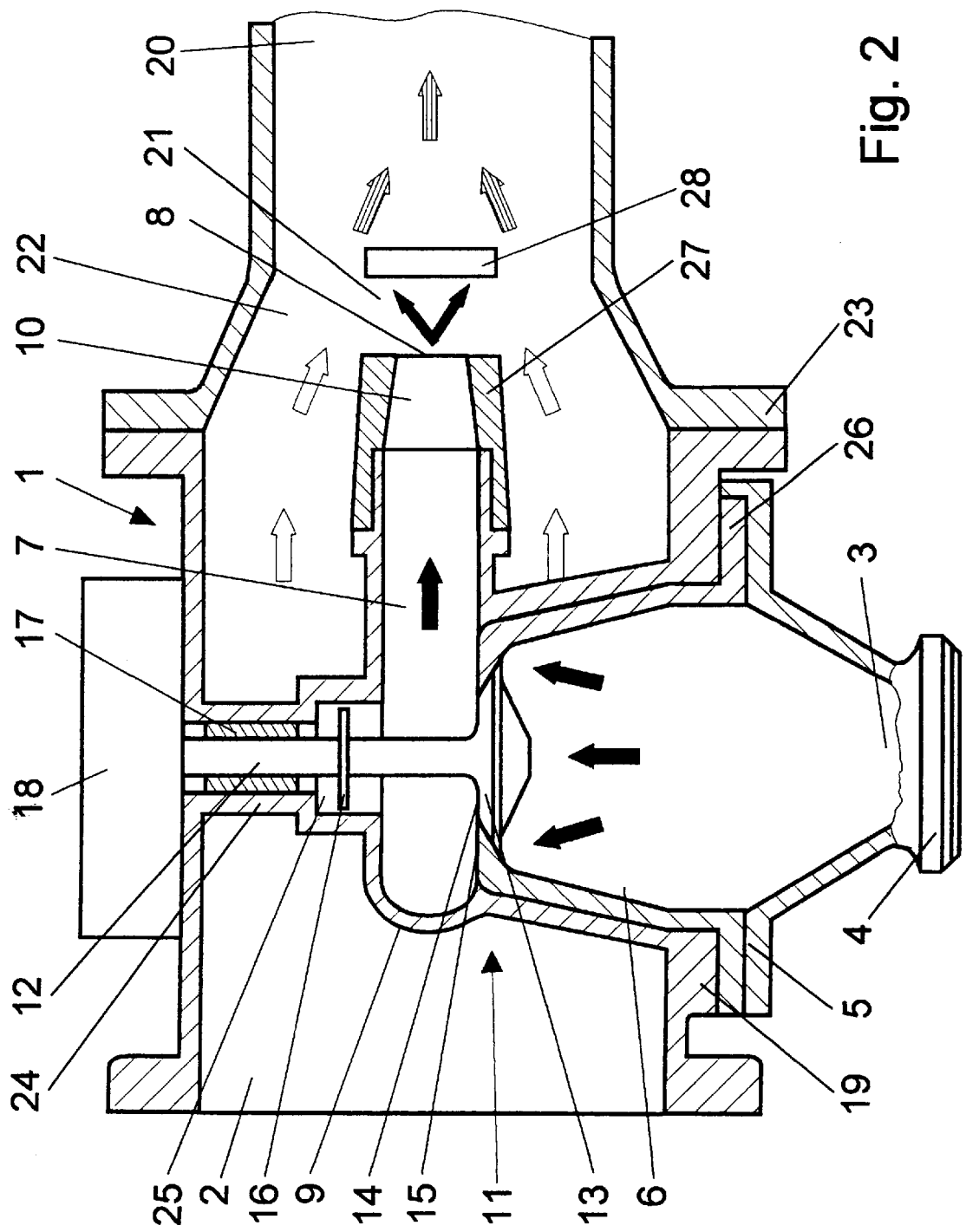
FIG. 2 shows a particular embodiment of the exhaust gas recirculation arrangement.

At the side opposite the discharge opening 8, the passage section 7 is closed by a streamlined wall portion. To facilitate manufacture, preferably a cap 9 is mounted onto the section 7. But, it is also possible to form the section 7 as a single piece as it is shown in FIG. 2.

The exhaust gas recirculation passage 3 is closed by a disc valve 11 including a valve disc 13 which is disposed on a valve seat 15 and which has a streamlined conical or semi-spherical shape at its side facing the exhaust gas flow. The valve disc 13 is connected to an operating mechanism 18 with which it can be opened via a valve shaft 12 in opposition to the flow direction of the exhaust gas. The operating mechanism 18 can be activated by mechanical, hydraulic, pneumatic, electromotive or magnetic means. It opens and closes the disc valve 11 depending on selected control parameters in order to optimize the operation of the internal combustion engine depending to the respective situation.

Since the disc valve 11 is subjected to the exhaust gas pressure when it is closed, it is always safely closed. The valve disc 13 has a top part 14, which extends into the passage section 7 of the gas recirculation passage 3. In this way, condensate, which may form during cooling on the valve shaft 12 is conducted onto the wall of the passage section 7 and does not lead to corrosion of the valve seat. The condensate is further conducted away by the particular shape of the nozzle-like cross-section 10 or it is evaporated during operation by the hot exhaust gases and the vapors are carried away.

In flow direction, after the valve disc 13, an impingement disc 16 is mounted on the valve shaft 12. It prevents the valve guide structure 17 of the disc valve 11 from being directly exposed to the hot exhaust gas flow. The valve guide structure 17, which is cooled by the cooler intake air, is therefore protected from thermal overload and contamination by small particles. In addition, the valve guide structure 17 is surrounded by a housing part 24, which is connected to the passage section 7 and the air intake duct 2 and which seals the valve shaft 12 to prevent oil from the crankcase vent entering the valve guide structure 17. The housing part 24 has a cylindrical recess 25 in which the impingement disc 16 is disposed with some clearance, whereby the valve guide structure 17 is protected still more effectively.

In order to facilitate the manufacture, the air intake duct 2 is formed in the area of the connection with the exhaust gas recirculation passage 3 as a separate housing part 19, which is mounted to a flange 23 of a charge air manifold 20.

The exhaust gas recirculation passage 3 includes, ahead of the disc valve 11, a widened area in the form of a double cone-like valve chamber 6, which is divided in its area of largest diameter. One part is formed integrally with the separate housing part 19, whereas the other part which includes a connector flange 4 for the exhaust gas recirculation line is connected to the separate housing part 19 by means of a flange 5. In this way, the disc valve 11 is easily accessible and easy to assemble. At the same time, the manufacturing costs for the housing port 19 are relatively low.

In the embodiment shown in FIG. 2, the part which is formed integrally with the separate housing part 19 preferably includes an insert 26, which includes the valve seat whereby the access opening can be increased. The nozzle-like cross-section 10 of the passage section 7 is formed by a separate nozzle portion 27, which is placed onto the passage section 7. Downstream of the mixing area 21, there is provided another impingement disc 28 in the air intake duct 2 which promotes the mixing of exhaust gas and fresh air. The housing part 19 may also be formed integrally with the connector flange 4 by injection molding without a core.

What is claimed is:

1. An exhaust gas recirculation arrangement for an internal combustion engine, said arrangement comprising: an air intake duct for supplying air to said engine, an exhaust gas recirculation pipe extending into said air intake duct for recirculating exhaust gas to said air intake duct, a disc valve arranged in said recirculation pipe for closing said recirculation pipe, said disc valve including a valve shaft extending transversely through said air intake duct, said exhaust gas recirculation pipe having a pipe section extending in said air intake duct in downstream direction from said disc valve and having a converging end portion forming a nozzle structure with a discharge opening leading to said air intake duct and being disposed centrally within said intake duct.

2. An exhaust gas recirculation arrangement according to claim 1, wherein said air intake duct includes in the area of the discharge opening a restriction of its flow cross-section.

3. An exhaust gas recirculation arrangement according to claim 1, wherein said disc valve includes a valve shaft extending through a part of said air intake duct and said recirculation pipe includes, at a transition to said pipe section which extends in said air intake duct, a valve seat on which said valve disc is sealingly seated when said disc valve is closed.

4. An exhaust gas recirculation arrangement according to claim 3, wherein said valve seat is formed by a valve seat ring.

5. An exhaust gas recirculation arrangement according to claim 3, wherein said valve disc has a top side projection projecting into said gas recirculation passage.

6. An exhaust gas recirculation arrangement according to claim 3, wherein one of a mechanical, electrical and hydraulic operating mechanism is provided for opening said disc valve in a direction against the flow direction of the exhaust gases in said gas recirculation passage.

7. An exhaust gas recirculation arrangement according to claim 6, wherein, just upstream of said disc valve, said exhaust gas recirculation passage is expanded to form an essentially double cone shaped valve chamber.

8. An exhaust gas recirculation arrangement according to claim 7, wherein said valve chamber is divided in the area of its largest diameter into one part which includes a connecting portion and a flange by which it is mounted to the other part.

9. An exhaust gas recirculation arrangement according to claim 8, wherein said air intake duct forms with the other part of said valve chamber and said pipe section of the exhaust gas recirculation passage a housing portion which includes the valve guide structure.

10. An exhaust gas recirculation arrangement according to claim 8, wherein said valve chamber includes an insert on which said valve seat is disposed.

11. An exhaust gas recirculation arrangement according to claim 1, wherein said disc valve includes a valve stem with an impingement disc, which protects the valve guide structure from the exhaust gases which enter the pipe section through the valve.

12. An exhaust gas recirculation arrangement according to claim 11, wherein said second housing part includes a cylindrical recess which is open toward said pipe section and said impingement disc is disposed in said recess with some clearance from the recess wall.

13. An exhaust gas recirculation arrangement according to claim 1, wherein the end of said pipe section opposite said discharge opening is closed by a streamlined cap.

14. An exhaust gas recirculation arrangement according to claim 1, wherein said valve guide structure is surrounded by a housing part which interconnects said housing part with said pipe section in a sealing manner.

15. An exhaust gas recirculation arrangement according to claim 1, wherein said nozzle structure is formed by a separate nozzle portion mounted onto said pipe section.

16. An exhaust gas recirculation arrangement according to claim 1, wherein an impingement disc is mounted in said air intake duct downstream of said discharge opening.

\* \* \* \* \*